United States Patent Office 3,759,690
Patented Sept. 18, 1973

3,759,690
HERBICIDAL COMPOSITIONS CONTAINING 2-CHLORO - 4 - TERT.BUTYLAMINO-6-CYCLO-PROPYLAMINO-s-TRIAZINE AND METHOD OF USE THEREFOR
Dagmar Berrer, Riehen, and Christian Vogel, Binningen, Basel-Land, Switzerland, assignors to Ciba-Geigy AG, Basel, Switzerland
No Drawing. Original application Mar. 17, 1969, Ser. No. 807,915, now Patent No. 3,629,257, dated Dec. 21, 1971. Divided and this application Oct. 28, 1970, Ser. No. 84,878
Claims priority, application Switzerland, Mar. 20, 1968, 4,147/68; Feb. 27, 1969, 2,946/69
Int. Cl. A01n 9/22
U.S. Cl. 71—93                                    2 Claims

ABSTRACT OF THE DISCLOSURE

2 - chloro - 4 - tert.butylamino-6-cyclopropylamino-s-triazine is disclosed as a novel compound useful for controlling aquatic weeds and also weeds and wild grasses in cotton plantations. Compositions containing the same as active ingredient and processes for the control of aquatic weeds and also weeds and wild grasses in cotton plantations are also described.

---

This application is a divisional application of application Ser. No. 807,915, filed Mar. 17, 1969, now U.S. Pat. No. 3,629,257.

DESCRIPTION OF THE INVENTION

The present invention concerns 2-chloro-4-tert.butylamino - 6 - cyclopropylamino-s-triazine, processes for the production of this new s-triazine, compositions for controlling weeds and wild grasses in water and in cotton plantations, which contain this new s-triazine as active substance, and processes for controlling said weeds and said wild grasses using the new s-triazine or compositions containing this compound.

More in particular, the invention provides 2-chloro-4-tert.butylamino-6-cyclopropylamino-s-triazine as a novel compound which is extremely suitable for controlling aquatic weeds, by virtue of the fact that it does not affect unfavourably the biological equilibrium of water, and that unlike the known s-triazine compounds, it is also suitable for controlling weeds and wild grasses in cotton plantations, because it does not affect cotton, particularly when applied before emergence of the plants.

The new triazine derivative only kills off plant growth slowly so that the parts of plants, which die off and sink down, decompose without impairing the oxygen balance of the water and do not unfavourably affect the biological equilibrium. In practical application concentrations of 0.1 to 5 mg. per litre, the new active substance is not toxic for warm blooded animals, fish and animals used as fish food. It possesses an extraordinarily wide range of action and can be used for controlling the most varied species of aquatic weeds such as, e.g. immersed plants, water-plants having floating leaves, submerged plants, algae etc. Even in the lowest concentrations, the new herbicidal active substance exhibits, after only a few days, a clear action.

This new substance is so far the only herbicide from the group of triazines, which does not affect cotton even when applied in high concentrations, and which moreover can be applied actually before the emergence of the plants.

In recent years, a series of herbicidal active substances from the group of s-triazines have become known for the control of weeds and wild grasses.

Only a few of the herbicides obtainable commercially are suitable also for controlling aquatic weeds since, on the one hand, they are too toxic for warm blooded animals, fishes and/or animals used as fish food, and, on the other hand, their action commences either too rapidly or too slowly. Where the activity is rapid and good, the weeds are indeed removed but, because of the rapidly dying off plants, there occurs an appreciable lowering of the oxygen content of the water as well as, in the case of waters having a weak current, a stoppage of the flow. Slowly acting herbicides, in practical application concentrations, actually only slightly change the oxygen content but, even where the waters are stagnant, the time that the weed and herbicide are in contact is, from experience, too short with respect to the occurring diffusion for control to be effective. Thus the frequently applied herbicidal triazine derivative 2 - chloro - 4,6-bis-ethylamino-s-triazine (Simazin) does not fully satisfy requirements in practice, since its action occurs too slowly. Only in high concentrations does it have a good action and, consequently, it thus endangers the biological equilibrium of the waters.

Apart from this none of the known triazines is an ideal weed-killer in cotton plantations. Tests have shown that the weeds can indeed be completely destroyed, but that under the conditions required to achieve this, the cotton plantations themselves are also damaged. Such s-triazine compounds are, as a rule, applied only after emergence of the cultivated plants. Among the herbicides known hitherto and which are prepared from the most varied categories of substances, not one active substance is known which can be used in cotton plantations before the emergence of the cultivated plants for the general and overall control of weeds. Some urea derivatives are certainly recommended as being suitable in this respect but their range of effectiveness is inadequate.

On account of technical and economic advantages, those herbicides are preferred which can also be applied before the emergence of the cultivated plants. If the active substances are applied so that they kill weeds and wild grasses during germination, then the unimpeded growth of the cultivated plants with resulting higher crop yields is assured. Permanent damage to the cultivated plants, such as can occur in the case of treatment after emergence, is thus avoided.

The new 2 - chloro - 4 - tert.butylamino - 6-cyclopropylamino-s-triazine is produced, according to the invention, by reacting either 4-tert.butylamino-2,6-dichloro-s-triazine with cyclopropylamine, or 6 - cyclopropylamino - 2,4-dichloro-s-triazine with tert.butylamine, in the presence of an acid-binding agent such as an inorganic base. It is also possible to use an excess of the amine as the acid-binding agent. It as advantageous to perform the reaction in the presence of a solvent or diluent which is inert to the reactants. Examples of the latter are aromatic hydrocarbons and halogen hydrocarbons, aliphatic hydrocarbons, etc. As the inorganic base, an alkali metal hydroxide, such as sodium hydroxide, is preferably used. The reaction temperature is between 15 and 40° C., preferably between 20 and 30° C. Furthermore, the active substance is also obtained by reacting cyanuric chloride in the presence of water and/or an organic solvent, partially soluble in water and inert to the reactants, with, in turn, one mol of each of the corresponding amines, i.e. tert.butylamine and cyclopropylamine. This reaction too is performed in the presence of an acid-binding agent such as an inorganic base, a tert.amine or the butylamine or cyclopropylamine used in excess.

Suitable as solvents or diluents for the reaction of the above mentioned dichloro-s-triazines are, preferably, aromatic hydrocarbons, halogen hydrocarbons, as well as aliphatic hydrocarbons. Examples of organic solvents for the reaction of the cyanuric chloride, which are partially soluble in water and inert to the reactants are, in particular, aliphatic ketones, especially methyl-ethyl ketones as well as diethyl ketones.

The new herbicidal triazine derivative, when applied for controlling aquatic weeds, is preferably applied in the form of dispersions (suspension and emulsion) which are obtained, by dilution with water, from active substance concentrates, such as wettable powders and emulsion concentrates. These dispersions can either be applied to the water or sprayed on to the immersed plants. The concentrations to be used generally depend on the type of plant to be destroyed, i.e. for submerged aquatic weeds, floating plants and algae between 0.1 and 5 mg. per litre of water, whereas for immersed plants they are between 0.5 and 4 kg./hectare of water surface.

The herbicidal compositions according to the invention whe used on cotton plantations contain concentrations of between 0.25 and 2.0 kg. of active substance per hectare, preferably between 0.5 kg. and 1.5 kg. per hectare. With the application of such compositions, the usual grass-like and broad-leaved weeds in cotton plantations can be destroyed.

Compositions according to the invention for controlling weeds in cotton plantations and which contain, as the active substance, 2-chloro-4-tert.butylamino-6-cyclopropylamino-s-triazine, can also contain additives commonly found in compositions for controlling weeds, such as carriers and dispersing agents. In order to extend the range of action, small amounts of other herbicides, which are harmless to cotton, can be added to these compositions.

The following tests show the action of the compound according to the invention on weeds, in comparison with known herbicides from the series of s-triazines:

2-chloro-4,6-bis-ethylamino-s-triazine (Simazin),
2-chloro-4-ethylamino-6-isopropylamino-s-triazine (Atrazin) and
2-chloro-4,6-bis-isopropylamino-s-triazine (Propazin).

The following test organisms were used to demonstrate the herbicidal effectiveness against water-weeds.

submerged plants:
  (1) *Sagittaris subulata*
  (2) *Heleocharis acicularia*
  (3) *Hygrophia polysperma*
  (4) *Myrophyllum brasilense* floating plants:
  (5) *Spirodela*
  (6) *Salvinia*

Algae:
  (7) *Green algae*

The submerged test plants (1) to (4) were each planted in silica sand in normal flower pots and these were placed into a 10 litre Plexiglass tank filled with tap water (German hardness 10). The plants were kept at room temperature, with daylight and additional artificial light (ca. 1200 lux during 12 hours daily).

The active substances are added to the water as a dispersion (emulsion or suspension) in the following concentrations: 0.5, 0.25 and 0.1 mg. of active substance per litre of water. The assessment was made using the Index 10 on the 7th, 21st and 28th day.

0=all plants died off, 10=unaffected as control plant, 1 to 9=intermediate stages of attack.

TABLE I

| Active substance | 1. Sagittaria, 28 days | | | 2. Heleocharis, 28 days | | 3. Hygrophila | | | | 4. Myriophyllum | | | | | |
|---|---|---|---|---|---|---|---|---|---|---|---|---|---|---|---|
| | | | | | | 21 days | | 28 days | | 7 days | | 21 days | | 28 days | |
| | 0.5 | 0.25 | 0.1 | 0.5 | 0.25 | 0.5 | 0.25 | 0.5 | 0.25 | 0.25 | 0.1 | 0.25 | 0.1 | 0.25 | 0.1 |
| 2-chloro-4-tert butylamino-6-cyclopropylamino-s-triazine | 1 | 5 | 8 | 4 | 6 | 0 | 3 | 0 | 2 | 4 | 8 | 0 | 0 | 0 | 0 |
| 2-chloro-4,6-bis-ethylamino-s-triazine (Simazin) | 10 | 10 | 10 | 10 | 6 | 10 | 10 | 10 | 10 | 10 | 10 | 10 | 7 | 10 | 7 |
| 2-chloro-4-ethylamino-6-isopropylamino-s-triazine (Atrazin) | 10 | 9 | 10 | 5 | 10 | 9 | 8 | 9 | 9 | 10 | 9 | 7 | 7 | 7 | 5 |
| 2-chloro-4,6-bis-isopropylamino-s-triazine (Propazin) | 8 | 8 | 8 | 10 | 10 | 8 | 10 | 8 | 10 | 10 | 10 | 10 | 10 | 10 | 10 |

In the following tests, floating plants and algae were used as test plants and were placed in measured quantities into Plexiglas tanks filled with tap water, the proportions being as follows: algae corresponding to 1–2 mg. dry weight to 100 ml. of water, Spirodela total 50 to 100 plants, Salvinia 4 to 10 plants. The plants were kept at room temperature, with daylight and additional artificial light (ca. 1200 lux during 12 hours daily).

The active substances were added as a dispersion (suspension or emulsion) in the concentrations (mg. per litre of water) given in the table. The control assessment was carried out on the 7th, 21st and 28th day and the evaluation was on the basis of the Index 10 (0=all plants or algae died off, 10=plants or algae unattacked), 1–9=intermediate stages of attack.

TABLE II

| Active substance | Spirodela | | | | | | | | Salvinia | | | | | |
|---|---|---|---|---|---|---|---|---|---|---|---|---|---|---|
| | 7 days | | 21 days | | | 28 days | | | 21 days | | | 28 days | | |
| | 0.5 | 0.1 | 0.5 | 0.25 | 0.1 | 0.5 | 0.25 | 0.1 | 0.5 | 0.25 | 0.1 | 0.5 | 0.25 | 0.1 |
| 2-chloro-4-tert. butylamino-6-cyclopropylamino-s-triazine | 2 | 6 | 1 | 1 | 2 | 1 | 1 | 2 | 2 | 1 | 3 | 1 | 0 | 1 |
| 2-chloro-4,6-bis-ethylamino-s-triazine (Simazin) | 8 | 9 | 5 | 9 | 9 | 7 | 9 | 9 | 7 | 1 | 9 | 7 | 8 | 9 |
| 2-chloro-4-ethylamino-6-isopropylamino-s-triazine (Atrazin) | 8 | 9 | 5 | 7 | 8 | 3 | 5 | 8 | 4 | 8 | 10 | 2 | 5 | 10 |
| 2-chloro-4,6-bis-isopropylamino-s-triazine (Propazin) | 3 | 10 | 2 | 9 | 10 | 1 | 9 | 10 | 6 | 5 | 10 | 6 | 5 | 9 |

TABLE III.—ALGAE

| Active substance | 7 days | | 21 days | | | 28 days | | |
|---|---|---|---|---|---|---|---|---|
| | 0.5 | 0.25 | 0.5 | 0.25 | 0.1 | 0.5 | 0.25 | 0.1 |
| 2-chloro-4-tert. butylamino-6-cyclopropylamino-s-triazine | 1 | 3 | 0 | 0 | 0 | 0 | 0 | 0 |
| 2-chloro-4,6-bis-ethylamino-s-triazine (Simazin) | 4 | 4 | 4 | 4 | 4 | 0 | 5 | 3 |
| 2-chloro-4-ethylamino-6-isopropylamino-s-triazine (Atrazin) | | | 3 | 4 | 4 | 0 | 1 | 3 |
| 2-chloro-4,6-bis-isopropylamino-s-triazine (Propazin) | | | 2 | 7 | 6 | 2 | 7 | 6 |

In the following test, Salvinia plants (2 x 4 leafpairs) were placed into a crystallisation dish filled with 250 ml. of nutrient solution and were kept at room temperature, with daylight and additional artificial light (ca. 1200 lux during 12 hours daily).

The active substances were sprayed directly as a dispersion (emulsion or suspension) on to the leaves.

Concentration: corresponding to 1 kg., 2.5 kg., 5 kg. per hectare of water surface. The control assessment was made after 6 and 12 days and evaluation was based on the Index 10.

TABLE IV.—SALVINIA

| Active substance | 6 days | | | 12 days | | |
|---|---|---|---|---|---|---|
| | 5 | 2.5 | 1 | 5 | 2.5 | 1 |
| 2-chloro-4-tert. butylamino-6-cyclopropylamino-s-triazine | 1 | 5 | 8 | 0 | 1 | 4 |
| 2-chloro-4,6-bis-ethylamino-s-triazine (Simazin) | 9 | 8 | 9 | 8 | 7 | 9 |
| 2-chloro-4-ethylamino-6-isopropylamino-s-triazine (Atrazin) | 9 | 10 | 10 | 4 | 8 | 9 |
| 2-chloro-4,6-bis-isopropylamino-s-triazine (Propazin) | 9 | 9 | 10 | 9 | 9 | 10 |

As the preceding tests show, the s-triazine, when used against submerged plants (Table 1), floating plants (Table II) and algae (Table III), with addition of the substance being made to the water in the smallest concentrations, exhibits after only a few days a more pronounced effect than the known comparative active substances in the higher concentrations. The known herbicides in these tests produce, even after 28 days, only slight or no destruction of the aquatic woods. The destruction level of the new active substance reaches a maximum within a few weeks and destruction occurs to an extent necessary for the maintenance of the oxygen balance of the water.

The following test serves to demonstrate the selective herbicidal action with regard to cotton of the active substance according to the invention, in comparison with the compounds known as herbicides, i.e. 2-chloro-4-ethylamino-6-isopropylamino-s-triazine and 2-chloro-4-ethylamino-6-cyclopropylamino-s-triazine.

The surface of moist sterile soil is sprayed with dispersions of active substances. The cotton is then sown and is kept at 20–24° C. in daylight with 70% relative atmospheric moisture.

Evaluation of the test results was carried out after 26 days.

The assessment was made on the basis of the index 10:

10=undamaged plants=control,
0=plants destroyed,
1–9=intermediate stages of damage.

The respective amounts applied (kg./ha.) of active substances and figures from control tests (in days) are given at the top of the table. The active substance dispersions had the following composition: 25 parts of active substance, 8.5 parts of lignin sulphonic acid calcium salt, 1.5 part of adhesive (1:1 polyvinyl pyrrolidon: Champagne chalk), 32 parts of kaolin, 33 parts of Champagne chalk, dispersed in an amount of water corresponding to 1000 litres per hectare.

TABLE V

| Compound | Applied amounts in kg./ha., control after 26 days | | | |
|---|---|---|---|---|
| | 0.5 | 1.0 | 2.0 | 4.0 |
| 2-chloro-4-tert. butylamino-6-cyclopropylamino-s-triazine according to the invention | 10 | 10 | 10 | 9 |
| 2-chloro-4-ethylamino-6-isopropylamino-s-triazine (known from the swiss Patent 329,277) | 7 | 5 | 0 | 0 |
| 2-chloro-4-ethylamino-6-cyclopropylamino-s-triazine (known from the Belgian Patent 714,891) | 4 | 3 | 0 | 0 |

In this test, the following weeds and wild grasses were then sown and treated in the same manner: rye grass, Alopecorus myosuroides, Agrostis spica-venti, Pon trivalis, Panicum italicum, Sinapis alba, Galliam aparine. 2-Chloro-4-tert.butylamino - 6 - cyclopropylamino-s-triazine, in the same way as the two known s-triazine derivatives, destroys these weeds practically completely with applied amounts of only 0.25 kg./ha.

As can be seen from Table V, the cotton plants remain completely undamaged with application of the practical active substance concentrations of 0.5 to 2 kg. per hectare. An excess application of the active substance, which can easily occur in practical application, does not harm the plants in any way. On the other hand, when using the known herbicides in these practical concentration ranges, the plants are severely damaged or even destroyed.

The following examples illustrate the production of the new compound. The temperatures are given in ° C.

EXAMPLE 1

A solution of 2.85 g. of cyclopropylamine in 10 ml. of benzene is added dropwise to a solution of 11 g. of 4-tert. butylamino-2,6-dichloro-s-triazine in 150 ml. of benzene. The reaction mixture heats up to 35°. After completion of the reaction, 2 g. of sodium hydroxide, dissolved in 50 ml. of water, are added to the mixture which is then stirred for 2 hours. The obtained precipitate is filtered off, washed with water and dried. The 2-tert.butylamino-4-chloro-6-cyclopropylamino-s-triazine, recrystallised from cyclohexane, has the M.P. 152–154°.

If instead of using 4-tert.butylamino-2,6-dichloro-s-triazine as starting material, 10.25 g. of 2,4-dichloro-6-cyclopropylamino-s-triazine (M.P. 100–101°) are used, this being then reacted, as described above, with 3.65 g. of tert. butylamino, then 2-chloro-4-tert.butylamino-6-cyclopropylamino-s-triazine, M.P. 152–154°, is likewise obtained.

EXAMPLE 2

To 1800 ml. of methyl-ethyl ketone and 1400 g. of ice are added at —4°, while stirring well, 153 g. of cyanuric chloride. At —4° to 0°, 219.4 g. of tert. butylamine are added dropwise and then, in the same temperature range, 121.2 g. of sodium hydroxide as a 30% aqueous solution are also added dropwise. The mixture is then stirred for 2 to 3 hours at 0° and then has a pH value of 7–8. 171 g. of cyclopropylamine are then added at 5 to 35° and subsequently, in the same temperature range, 120 g. of sodium hydroxide are added as a 30% aqueous solution. The reaction mixture is stirred for 10 hours at room temperature, the solid fraction is then filtered off, washed with water and dried. The 2-chloro-4-tert. butylamino-6-cyclopropylamino-s-triazine, M.P. 154°, is obtained in 93.5% yield.

The production of the herbicidal active substance concentrates is carried out in a manner known per se by the intimate mixing and grinding of the active substance with suitable carriers, with the addition of dispersing agents or solvents whch are inert to the active substance. The active substance can exist and be used in the following forms:

As concentrates of active substances dispersible

| | |
|---|---|
| In water | Wettable powders, pastes, emulsions. |
| As liquids | Solutions, aerosols. |
| As solids | Sprinkling agents and granulates. |

Active substance concentrates, i.e. wettable powders, pastes and emulsion concentrates, dispersible in water, are agents which can be diluted with water to produce any desired concentration. They consist of active substance, carrier, optionally stabilising additives, surface-active substances and anti-foaming agents and, optionally, solvents. The concentration of active substance in these agents is 5–80% calculated on the total weight of the agent.

The wettable powders and pastes are obtained by mixing and grinding the active substance with dispersing agents and pulverulent carriers in suitable devices until homogeneity is attained. It is advantageous in some cases to use mixtures of different carriers. Suitable as dispersing agents are, e.g. condensation products of sulphonated naphthalene derivatives with formaldehyde, condensation products of naphthalene or of naphthalene sulphonic acid with phenol and formaldehyde as well as alkali, ammonium and alkaline-earth salts of lignin sulphonic acid, also alkylaryl sulphonates, alkali and alkaline earth-salts of dibutyl nphthalene sulphonic acid, fatty alcohol sulphate such as salts of sulphated fatty alcohol glycol ether, the sodium salt of oleoyl ethionate, the sodium salt of oleoyl methyl tauride, ditertiary acetylene glycols, dialkyldilauryl ammonium chloride and fatty acid alkali and alkaline-earth metal salts.

Suitable as anti-foaming agents are, e.g. silicones, etc.

The active substance is so mixed, ground, sieved and strained with the above mentioned additives that the solid particle size in the case of wettable powders does not exceed 0.02–0.04 mm. and in the case of pastes 0.003 mm. Dispersing agents such as those mentioned in the preceding sections, organic solvents and water are used to produce emulsion concentrates and pastes. Suitable solvents are, e.g. alcohols, benzene, xylols, toluene, dimethyl sulphoxide and mineral oil fractions boiling between 120–350°. The solvents must be practically without smell, not phytotoxic, inert to the active substances and not readily inflammable.

Furthermore, the agents according to the invention can be used in the form of solutions. In this case, the active substance is dissolved in suitable organic solvents, mixtures of solvents or in water. Aliphatic and aromatic hydrocarbons, chlorinated derivatives thereof, alkyl naphthalenes, mineral oils, and their own or mixed with each other, can be used as organic solvents.

This active substance concentrates are produced by mixing the active substance with suitable carriers and/or dispersing agents. In order to widen the range of action of the triazine derivative according to the invention, other herbicides can be added to these concentrates. For controlling aquatic weeds the compositions may contain e.g. herbicides from the series of triazines such as other halogen-diamine-s-triazines, alkoxy and alkylthio-diamine-s-triazines, triazoles, diazines such as uracils, aliphatic carboxylic acids and halogen carboxylic acids, halogenated benzoic acids and phenyl acetic acids, aryloxyalkano carboxylic acids, hydrazides, amides, nitriles and esters of suchlike carboxylic acids, carbamic acid esters and thiocarbamic acid esters, ureas, etc. Generally other biocidal active substances can be mixed with the compositions according to the invention. Thus in addition to the stated compounds and depending on their intended use, the new compositions may also contain, e.g. insecticides, fungicides, bactericides, fungistatics or bacteriostatics, in order to widen the range of action. The compositions according to the invention can also contain fertilisers, trace elements, etc.

Forms of preparation of the active substance are described in the following. Unless otherwise expressly stated, parts are by weight.

Wettable powder

The following materials are used to produce a 50% wettable powder:

50 parts of 2-chloro-4-tert.butylamino-6-cyclopropyl-amino-s-triazine,
5 parts of sodium dibutyl naphthyl sulphonate,
3 parts of naphthalene sulphonic acid/phenol sulphonic acid/formaldehyde condensate, 3:2:1,
20 parts of kaolin,
22 parts of Champagne chalk.

The active substance is applied to the carriers kaolin and chalk and subsequently mixed and ground with the given additions. A wettable powder is obtained having excellent wettability and suspension properties. Suspensions of any desired active substance concentration can be obtained from such a wettable powder by dilution with water.

Emulsion concentrate

The following materials are mixed together to produce a 10% emulsion concentrate:

10 parts of 2-chloro-4-tert.butylamino-6-cyclopropyl-amino-s-triazine,
15 parts of oleoyl polyglycol ether with 8 mol of ethylene oxide,
75 parts of isophorone.

This concentrate can be diluted with water to give emulsions of suitable concentrations. Such emulsions are suitable for the control of weeds in rice cultivation, fish ponds and cotton plantations.

We claim:
1. A composition comprising a herbicidally effective amount of 2 - chloro - 4 - tert-butylamino-6-cyclopropyl-amino-s-triazine and an agriculturally acceptable carrier or dispersing agent or a mixture of said carrier and said agent.

2. A process for controlling weeds and wild grasses in cotton plantations, which comprises applying to a cotton plantation a composition-of-matter comprising a herbicidally effective amount of 2-chloro-4-tert-butylamino-6-cyclopropyl-amino-s-triazine.

References Cited
UNITED STATES PATENTS

| | | | |
|---|---|---|---|
| 2,891,855 | 6/1959 | Gysin et al. | 71—93 |
| 3,451,802 | 6/1969 | Neighbors et al. | 71—93 |

JAMES O. THOMAS, JR., Primary Examiner

U.S. Cl. X.R.

71—66